(12) United States Patent
Chowdhury et al.

(10) Patent No.: US 11,429,694 B2
(45) Date of Patent: Aug. 30, 2022

(54) RULE-BASED RESOURCE MANAGEMENT SYSTEM

(71) Applicant: Amazon Technologies, Inc., Seattle, WA (US)

(72) Inventors: Murtaza Chowdhury, Sammamish, WA (US); Malcom Featonby, Sammamish, WA (US); Adnan Ijaz, Redmond, WA (US); Anup P. Pandya, San Jose, CA (US); Anupama Anand, Cupertino, CA (US); Niti Khadapkar, Union City, CA (US); Ramapulla Reddy Chennuru, Sunnyvale, CA (US); Raviprasad Mummidi, Mountain View, CA (US); Srivasan Ramkumar, Milpitas, CA (US); Jagruti Patil, Sunnyvale, CA (US); Yupeng Zhang, San Jose, CA (US)

(73) Assignee: Amazon Technologies, Inc., Seattle, WA (US)

(*) Notice: Subject to any disclaimer, the term of this patent is extended or adjusted under 35 U.S.C. 154(b) by 256 days.

(21) Appl. No.: 16/104,661

(22) Filed: Aug. 17, 2018

(65) Prior Publication Data

US 2020/0057841 A1 Feb. 20, 2020

(51) Int. Cl.
*G06F 21/10* (2013.01)
*H04L 9/40* (2022.01)

(52) U.S. Cl.
CPC .......... *G06F 21/105* (2013.01); *H04L 63/102* (2013.01); *G06F 2221/0768* (2013.01)

(58) Field of Classification Search
CPC ................. G06F 21/105; G06F 21/121; G06F 2221/0768; G06F 2221/0775; H04L 63/102

See application file for complete search history.

(56) References Cited

U.S. PATENT DOCUMENTS 5,845,065 A * 12/1998 Conte ................... G06F 21/105
726/31
6,105,069 A * 8/2000 Franklin ................. G06F 21/10
709/217

(Continued)

FOREIGN PATENT DOCUMENTS

CA 2754304 A1 * 4/2012 ............... G06F 9/50
WO 2014116201 A1 7/2014

OTHER PUBLICATIONS

International Search Report and Written Opinion for related International Patent Application No. PCT/US2019/046827, dated November 6, 2019, 12 pages.

*Primary Examiner* — Lynn D Feild
*Assistant Examiner* — Abdullah Almamun
(74) *Attorney, Agent, or Firm* — Nicholson De Vos Webster & Elliott LLP

(57) ABSTRACT

Techniques for managing customer license agreements are described. In one embodiment, a user-specified resource metric of a license model and a user-specified limit of the user-specified resource metric are obtained. A request for permission to launch a new compute resource at a computing device of the provider network is obtained from a service within a provider network. The new compute resource having a property that is an amount of the user-specified metric. A determination is made that a launch of the new compute resource would cause the user-specified limit to be exceeded, and the request the request to launch the new compute resource is denied.

14 Claims, 8 Drawing Sheets

(56) References Cited

U.S. PATENT DOCUMENTS

| | | | |
|---|---|---|---|
| 6,532,488 B1* | 3/2003 | Ciarlante | H04L 69/329 709/205 |
| 6,594,819 B1* | 7/2003 | Ciarlante | G06Q 30/06 717/177 |
| 8,769,299 B1* | 7/2014 | Dickson | G06F 21/105 713/189 |
| 9,672,334 B1* | 6/2017 | Marnell | G06F 21/105 |
| 9,912,553 B1* | 3/2018 | Grebenschikov | H04L 67/10 |
| 10,528,994 B2* | 1/2020 | Lingafelt | G06Q 30/06 |
| 2001/0013064 A1* | 8/2001 | Cox | G06F 21/105 709/220 |
| 2002/0069172 A1* | 6/2002 | Omshehe | G06Q 10/06 705/51 |
| 2007/0198428 A1* | 8/2007 | Satkunanathan | G06Q 30/06 705/59 |
| 2007/0233608 A1* | 10/2007 | Burkhart | G06Q 50/18 705/59 |
| 2009/0299791 A1* | 12/2009 | Blake | G06Q 10/107 705/40 |
| 2011/0273737 A1* | 11/2011 | Hirao | G06F 21/105 358/1.14 |
| 2011/0302623 A1* | 12/2011 | Ricci | G06F 21/105 726/1 |
| 2012/0072995 A1* | 3/2012 | Crawford | G07C 9/22 726/26 |
| 2014/0156784 A1* | 6/2014 | Buck | G06F 16/2379 709/217 |
| 2014/0379593 A1* | 12/2014 | Koehler | G06F 21/105 705/318 |
| 2014/0379594 A1* | 12/2014 | Alongi | G06Q 30/01 705/318 |
| 2015/0363179 A1* | 12/2015 | Anderson | G06F 8/61 717/121 |
| 2016/0026968 A1* | 1/2016 | Fan | G06Q 10/087 707/769 |
| 2016/0147550 A1* | 5/2016 | McWilliams | G06F 11/301 718/1 |
| 2016/0162666 A1* | 6/2016 | Casey | H04L 67/10 726/29 |
| 2016/0269246 A1* | 9/2016 | Masuda | H04L 41/12 |
| 2016/0314447 A1* | 10/2016 | Trevathan | G06Q 21/105 |
| 2016/0381076 A1 | 12/2016 | Kamble et al. | |
| 2017/0053120 A1 | 2/2017 | Kamble et al. | |
| 2017/0161470 A1* | 6/2017 | Feng | G06F 21/105 |
| 2017/0199990 A1* | 7/2017 | Boudreau | G06F 8/63 |
| 2019/0087204 A1* | 3/2019 | Babol | G06F 9/45533 |
| 2019/0228134 A1* | 7/2019 | Ohhata | G06F 11/3006 |

* cited by examiner

| ID 205 | NAME 210 | DESCRIPTION 215 | NUMBER OF LICENSES 220 | LICENSING METRIC 225 | METRIC TO LICENSE RATIO 230 | DAYS OF AFFINITY 235 | LIMIT 240 | ALLOWED TENANCY 245 | PRESERVE HISTORY 250 | RESOURCE IDS; USAGE 255 |
|---|---|---|---|---|---|---|---|---|---|---|
| ABCD1234 | WINDOWS SERVER ENTERPRISE LICENSES | LICENSING RULES DESCRIBING WINDOWS SERVER ENTERPRISE LICENSE AGREEMENT TERMS | 200 | PHYSICAL CORES | 1 | 90 | HARD | DEDICATED HOSTS | YES | I-129381  5<br>H-199121  2<br>MI-168246  1<br>... |
| DEFA5678 | SQL SERVER ENTERPRISE LICENSES | LICENSING RULES DESCRIBING SQL SERVER ENTERPRISE LICENSE AGREEMENT TERMS | 100 | VIRTUAL CPUS | 1 | 0 | HARD | ALL | YES | 5 |
| 1CCA2241 | VENDOR X VIDEO RENDERING LIBRARY LICENSES | LICENSING RULES DESCRIBING VENDOR X VIDEO RENDERING SOFTWARE LICENSE AGREEMENT TERMS | 10 | (<4 GPUS) / (CPU SOCKET) | 1 | 0 | SOFT | ALL | YES | 0 |

*FIG. 2*

RULE-BASED RESOURCE MANAGEMENT SYSTEM

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the following figures.

FIG. 2 is a diagram illustrating an exemplary data structure for storing license rules configurations and tracking license usage according to some embodiments.

DETAILED DESCRIPTION

Various embodiments of methods, apparatus, systems, and non-transitory computer-readable storage media for managing licensed resources are described. According to some embodiments, a provider network includes a license manager service (LMS) to help customers manage and track computer software and/or hardware licenses and usage of software and/or hardware under licenses. The LMS allows customers to leverage existing licenses when using resources within the provider network to avoid the additional cost of obtaining additional, possibly duplicate licensing rights. The LMS can proactively enforce licensing rules to aid in license compliance for the customer and/or send alerts relating to license usage or consumption to the customer to reduce the risk of license overages and non-compliance. In addition, the LMS provides license usage reports to provide customers with visibility into license usage and to comply with vendor audits.

Customers model existing license agreements within the LMS using a generic licensing construct. The modeled license forms part of a license rules configuration that includes properties pertaining to the license, such as a user-specified metric that identifies how license consumption is measured, where the software can be run, and a user specified-limit that identifies how much consumption is permitted. When the customer attempts to launch an instance of a resource, such as a compute instance or a database instance having a particular software and hardware configuration, the LMS tracks the consumption of any licenses associated with the software or hardware configuration and, in some embodiments, prevents the launch. For example, a customer might have a license with a particular operating system software vendor that allows the customer to use the software on ten separate processor cores. The customer defines the license metric (processor cores) and limit (ten) with the LMS. When the customer attempts to launch an instance of a resource that has a software configuration that includes the operating system software and an underlying hardware configuration with two processor cores, the LMS checks whether the number of physical cores associated with the instance would exceed the limit (based on any existing instances that might be consuming the license) and, if so, denies the launch or permits the launch and alerts the customer of the overage.

Figure 1:
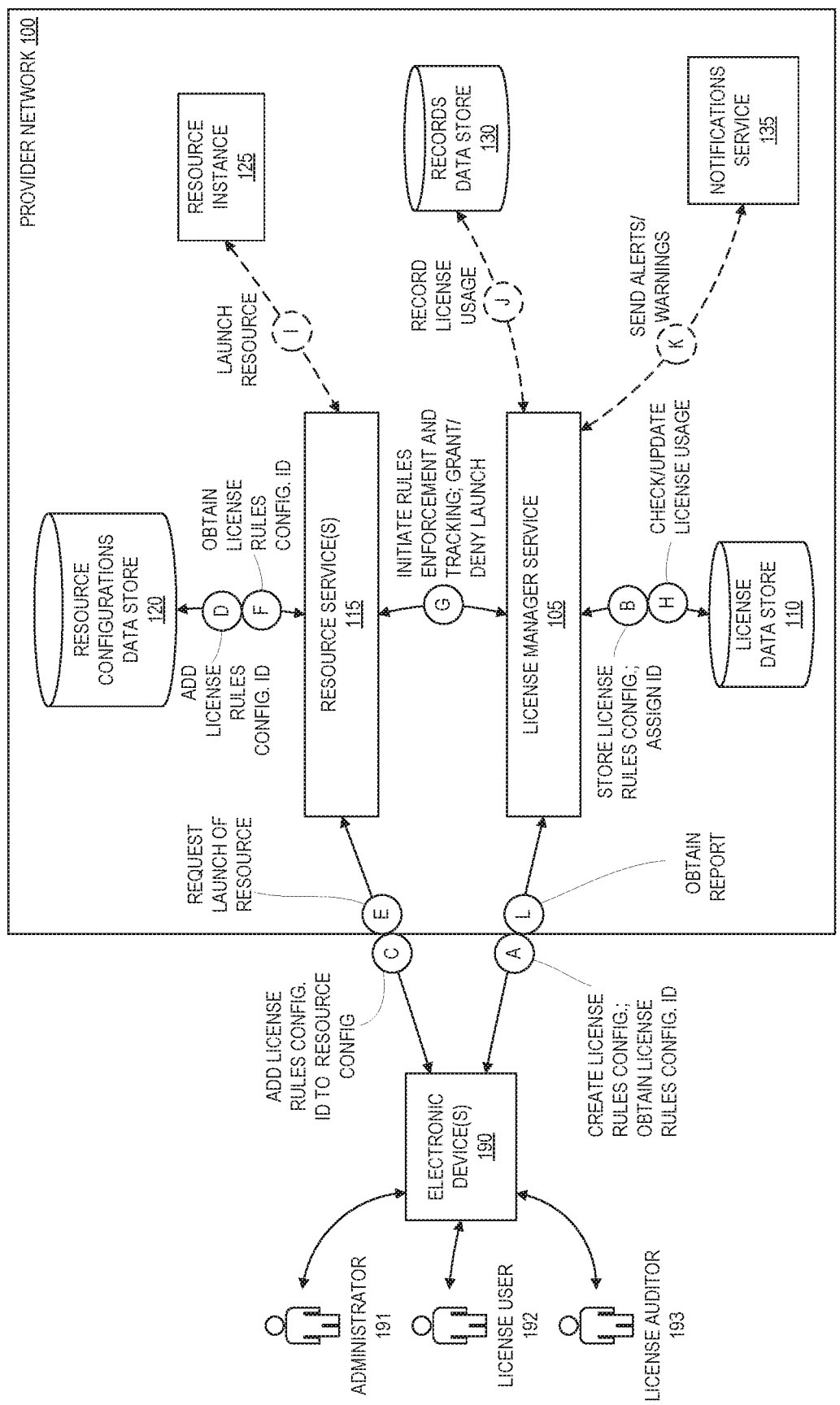
FIG. 1 is a diagram illustrating an environment for assigning and monitoring license usage associated with new resources according to some embodiments.

FIG. 1 is a diagram illustrating an environment for assigning and monitoring license usage associated with new resources according to some embodiments. At a high level, the environment includes one or more resource services 115 and a license manager service (LMS) 105 that are part of a provider network 100. In some embodiments, the LMS 105 includes one or more APIs (not shown) that allow other components of the provider network 100 to communicate with the LMS 105. Users can create license rules configurations with the LMS 105 that specify the metric by which a license is consumed (e.g., central processing unit sockets), a limit on license consumption (e.g., "5"), and when or how the software associated with the license can be run (e.g., within a service provider environment or within a customer operated location). Leveraging a resource service 115, users can create instances of computing-related resources that consume an amount of the specified metric (e.g., a two-socket server consumes two sockets of the available license limit), and the LMS 105 tracks license usage.

The environment illustrated in FIG. 1 includes one or more electronic devices 190 in communication with a provider network 100. Communications between the electronic device 190 and the provider network 100 occur across one or more intermediate networks such as the Internet (not shown). Further, communications between the electronic device 190 and the provider network 100 may occur via one or more "frontend" services that are part of the provider network 100 (not shown) and that facilitate communications to "backend" services, which, in some embodiments, include the LMS 105 and/or the resource services 115. Exemplary frontend services may expose application programming interfaces (APIs) to provide users with the ability to interact with the backend services. Interactions may occur via a web-browser based interface, a command-line interface (CLI), or via software development kit (SDK) integration. Other exemplary frontend services include access control services that verify the identity of a user and his or her associated permissions to access various computing-related resources within the provider network 100. Note that the users of the provider network 100 may utilize one or more user accounts that are associated with a customer account (e.g., a business has a customer account that includes multiple user accounts of different types for its employees), though these terms may be used somewhat interchangeably depending upon the context of use. Exemplary user types include license administrators 191, license users 192, and license auditors 193. In some embodiments, only the administrator 191 can create or modify license rules configurations with the LMS 105, either the administrator 191 or the license user 192 can instantiate resources within the provider network 100 that may require licenses, and the license auditor 193 is limited to accessing records related to license usage; each scenario is described in greater detail below.

The resource services 115 provide users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage), network-related resources (e.g., configuring virtual networks including groups of compute resources, content delivery networks (CDNs), Domain Name Service (DNS)), application resources (e.g., databases, application build/deployment services), etc. These and other computing-related resources may be provided as services that allow a user to create instances of the underlying compute resource. One exemplary resource service 115 is a compute service that allows users to create compute resource instances comprising one or more software programs executed by a particular hardware configuration.

Another exemplary resource service 115 is a database service that allows users to create database instances comprising one or more software programs, including database software, executed by a particular hardware configuration.

In some embodiments, a resource configurations data store 120 maintains resource configurations. Resource configurations can specify the hardware configuration and/or the software configuration for one or more resource instances that can be launched within the provider network 100. Exemplary resource configurations include instance types, machine images, launch templates, and formation templates. Instance types represent hardware configurations without specifying any particular software executed by the hardware. Machine images represent software configurations without specifying the underlying hardware in which the software is executed. For example, an instance type might specify a number of central processing units (CPUs) in a computer system, an amount of memory (e.g., random-access memory) in the computer system, and an amount of storage in the computer system (e.g., from a solid-state drive), while a machine image might specify an operating system and set of software programs that are executed within the operating system. Launch templates specify both an instance type and a machine image, and formation templates might specify the instance type and machine image of multiple instances, including any additional intra-instance communication settings, etc. (e.g., virtual private network configurations). Resource configurations data store 120 may be one or more storage locations within the provider network 100 that are accessible by one or more customers (e.g., a public data store with pre-configured machine images, another public data store with pre-configured launch templates, a private data store with a specific customer's formation templates, etc.).

In some embodiments, resource configurations have an associated set of properties that characterize the configuration. The properties associated with a resource configuration may be stored along with the resource configuration in the resource configurations data store 120 or associated with the resource configuration by the resource service 115. Properties may be implicitly or explicitly tied to a resource configuration. For example, a formation template might have an implicit property corresponding to an explicit property of an instance type included in the formation template. Exemplary properties associated with a software configuration include an identity of the software program(s), vendor(s), and version(s) of the included software (e.g., [{"Vendor":"Ubuntu", "Program":"Linux", "Version":"18.04" }, {"Vendor":"Oracle", "Program":"Database", "Version":"12.1.0.1"}]).

A variety of properties can be used to characterize hardware configurations. Exemplary properties include performance properties such as by central processing unit (CPU) clock speed, number of CPU cores, memory throughput (e.g., in gigabytes per second), storage throughput, networking throughput, etc. Other exemplary properties include physical properties such as a type or number of CPUs, an amount of memory (e.g., random-access memory), amount of storage (e.g., solid-state drives), whether the instance includes dedicated accelerator hardware, the number of accelerators, etc. Additional properties associated with hardware configurations include whether the performance is in a virtual or physical computing environment (e.g., whether using virtualization technologies or running on a bare-metal computer system), whether the hardware configuration is dedicated to a particular user or shared amongst unrelated users, the location of the computer system (e.g., physically or logically, such as relative to other computer systems within a network or on a particular network). For example, in a shared, virtual hardware configuration, the performance properties might specify the number of virtual CPUs (vCPUs) and associated amount of memory accessible to the vCPUs associated with a single instance of the hardware configuration, of which the underlying physical hardware might be able to host up to four, eight, sixteen, or even more instances of the virtual configuration for different customers.

An overall flow of assigning and monitoring license usage associated with new resources in the provider network 100 is outlined by the encircled letters "A" through "L" in FIG. 1. Circles A through D generally relate to creating license rules configurations; circles E through I generally relate to license consumption (e.g., when launching a resource instance); and circles J through L generally relate to license usage monitoring.

At circle A, an administrator 191 can cause an electronic device 190 to send a message to the LMS 105 to create a license rules configuration. The message may be sent via a frontend interface (e.g., via a CLI, web-browser interface, SDK, etc.). In an exemplary embodiment, a license rules configuration includes various properties that can be used to represent an underlying license agreement and configure how the LMS 105 operates as part of monitoring license usage. Exemplary properties include the following:

Name: A user-specified name that can be used to identify the license.

Description: A user-specified description that can provide additional details regarding the license.

NumberOfLicenses: A user-specified value representing the number of licenses available under the license agreement.

LicensingMetric: A user-specified metric by which licenses are consumed under the license agreement. Exemplary metrics include performance metrics (that relate to the hardware configuration parameters described above) or other forms of metering found in license agreements, such as physical processor sockets (e.g., the physical interface between a CPU and a motherboard), physical computer systems (e.g., whether single- or multi-CPU coupled via a motherboard), virtual measurements (e.g., vCPUs), whether the computer system is within the provider network 100 or in some other location, etc. Metrics may be a single metric, as described above, or defined as a function of multiple metrics, such as a number of vCPUs allowed per physical socket or a number of instances allowed per physical computer system, etc.

MetricToLicensesRatio: A user-specified value representing a ratio that relates the LicensingMetric to the NumberOfLicenses (if different than 1). For example, if each license grant permits executing software on two cores, the value of MetricToLicensesRatio would be 2.

DaysOfServerAffinity: A user-specified value representing an amount of time that a license remains attached to a particular server for server-bound licenses. Some licenses limit the frequency at which a software program can be moved between different compute resources (e.g., cannot be executed until 90 days after first being executed on a given server).

AllowedTenancy: A user-specified property that indicates whether the licensed subject matter can be used on a system shared with other customers or dedicated to a single customer. Exemplary values include "Shared," "Dedicated," "Any."

UsageLimitType: A user-specified property that indicates to the LMS 105 whether it should limit new resource instance creation if a new resource instance would cause the NumberOfLicenses to be exceeded or otherwise violate the underlying license agreement.

PreserveHistory: A user-specified Boolean to indicate to the LMS 105 whether it should keep a license usage history.

PreserveHistoryLocation: A user-specified data store in which to store the license usage history (if PreserveHistory is true).

PreserveHistoryRetentionPeriod: A user-specified property representing an amount of time to retain the license usage history (e.g., 90 days).

PreserveHistoryFrequency: A user-specified property representing a frequency (e.g., in hours) at which to record current license usage. No value indicates license usage should be updated on launch and termination of a resource instances.

ExpirationDate: A user-specified property that indicates the expiration date of the license agreement.

Additional {LicensingMetric, NumberOfLicense} property pairs if the underlying license agreement provides multiple license consumption methods, optionally including a property that includes a formula for calculating the total license usage (when multiple consumption methods are used) and/or a property that prioritizes methods of license consumption.

Other embodiments may include more, fewer, or a variable number of license properties in a license rules configuration, and the properties may represent a variety of factors such as those similar to those described above and others.

At circle B, having received the license properties, the LMS 105 creates a license rules configuration that includes the properties in the license data store 110, which may be a database or other storage location that maintains the license rules configurations. In some embodiments, the license data store 110 provides version-controlled storage of the license rules configuration to manage updates, track changes, and provide the ability to export and import licensing definitions. Also as indicated at circle B, the LMS 105 assigns a license rules configuration identifier (also referred to as a license identifier) that uniquely identifies the license rules configuration from other license rules configurations (either globally within the provider network 100 or locally within the customer account). The LMS 105 sends the assigned license identifier to the electronic device 190, as indicated at circle A.

At circle C, having received the license identifier of the new license rules configuration, an administrator 191 can cause an electronic device 190 to send a message to the resource service 115 to add the license identifier to or to otherwise associate the license identifier with one or more resource configurations stored in the resource configurations data store 120 (e.g., instance types, machine images, launch templates, and formation templates). As above, the message may be sent via a frontend interface (e.g., via a CLI, web-browser interface, SDK, etc.). Multiple license identifiers may be added to each resource configuration for configurations that leverage multiple licensed resources (e.g., multiple software programs). At circle D, the resource service 115 adds the license identifier to the resource configuration in the resource configurations data store 120 (e.g., as a tag or property of the resource configuration).

At circle E, once a license rules configuration is created and added to a resource configuration, a license user 192 can cause an electronic device 190 to send a message to the resource service 115 to request the launch or instantiation of a resource configuration. Exemplary messages might identify an instance type and a machine image, a launch template, or a formation template, and are again sent via a frontend interface as described above. At circle F, the resource service 115 obtains the license identifier(s) added to the resource configuration in the resource configurations data store 120 based on the resource configuration identified in the request. In addition, the resource service 115 obtains other properties associated with the resource configuration (e.g., properties associated with the software or hardware configuration of the requested resource configuration).

At circle G, the resource service 115 sends a message to the LMS 105 that requests permission to launch a resource instance. The message may be sent to an API that is part of the LMS 105 and allows for backend services to interact with the LMS 105. The message includes the obtained license identifier(s) and other properties associated with the resource configuration such (e.g., number of vCPUs associated with the resource configuration requested at circle E). The message may further include a preliminary resource identifier to identify the resource instance 125 if permission is granted.

In some embodiments, the request for permission is sent via a synchronous interface to cause the resource service 115 to delay launching the resource instance 125 until it receives permission from the LMS 105, thereby avoiding license overages.

At circle H, the LMS 105 obtains one or more properties associated with the license rules configuration identified by the license identifier and performs a rules check to determine whether instantiation of the resource instance is permissible under the license rules configuration. To do so, the LMS 105 evaluates the resource configuration properties against a set of rules specified by the license properties.

In some embodiments, the LMS 105 evaluates whether the resource configuration properties include an identification of the metric identified by the LicensingMetric property. For example, if LicensingMetric is vCPUs, the resource configuration properties include a value for or comparable to vCPUs. If the resource configuration cannot be evaluated against the LicensingMetric, the rule is violated. In some embodiments, the LMS 105 evaluates whether the amount of the LicensingMetric identified by the resource configuration properties as adjusted by the MetricToLicensesRatio property, if other than 1, does not exceed the NumberOfLicenses property after accounting for current license usage. For example, this rule would not be violated if the resource configuration properties identify two vCPUs, the MetricToLicensesRatio indicates that two vCPUs consume one license, the NumberOfLicenses is 100 and the LMS 105 determines there are five licenses used (indicating 95 licenses are available). In some embodiments, the LMS 105 evaluates whether the resource configuration properties indicate the underlying hardware supporting the resource instance is consistent with the AllowedTenancy property. For example, a shared hardware configuration (supporting multiple virtual machines of different users or customers) would fail a rule check if the AllowedTenancy property required Dedicated tenancy. In some embodiments, the LMS 105 evaluates whether the resource configuration properties indicate the resource instance can be traced to particular physical hardware. For example, a virtual hardware configuration rather than a physical hardware configuration would fail a rule check if the DaysOfServerAffinity property was greater than zero (indicating the license had to be tied to a physical server). In some embodiments, the LMS 105 verifies that the ExpirationDate property does not indicate the license has expired. The set of rules evaluated as part of a compliance check can vary from one embodiment to another.

In some embodiments if one or more of the rules are violated, the LMS 105 proceeds based on the value of the UsageLimitType property in the license rules configuration. If the UsageLimitType property indicates there is a hard limit on license consumption, the LMS 105 responds to the resource service 115 by denying the request for permission to launch the resource instance. In some embodiments, the LMS 105 can cause the resource service 115 to propagate an error message to the license user 192 that includes the reason for the failure to launch the resource instance (e.g., launching would exceed the NumberOfLicenses property). In some embodiments, the error message can be tailored by the license administrator 191 during configuration of the license rules configuration. If the UsageLimitType property indicates there is a soft limit on license consumption, the LMS 105 responds to the resource service 115 by granting the request for permission to launch the resource instance. If none of the rules are violated, the LMS 105 can grant the request to launch the resource instance from the resource service 115. In some embodiments, the grant or denial of permission to launch a resource instance may depend on the specific rule or rules the LMS 105 determined were violated.

When the LMS 105 grants permission to the resource service 115 to launch the resource instance, the LMS 105 may update the license data store 110 with a record of the preliminary resource identifier sent with the request for permission to aid in tracking current license usage. In some embodiments, the resource service 115 assigns a resource identifier after receiving permission and sends the assigned resource identifier to the LMS 105. Upon receiving permission, the resource service 115 launches the resource instance 125, as indicated at circle I.

Returning to circle H, the LMS 105 can determine existing license consumption in a variety of ways. For example, the LMS 105 can update a data structure associated with the license rules configuration in the license data store 110 each time it grants permission to launch a resource instance with the number of licenses consumed by the permitted resource instance. The number of consumed licenses may be stored without attributing consumption to any particular resource instance (e.g., 50 consumed licenses) or attached to each permitted resource instance (e.g., resource identifier A is attributed 5 licenses, resource identifier B is attributed 1 license, etc.). In some embodiments, if the number of licenses consumed by each resource instance is constant, the LMS 105 can track the identity of each launched resource instance and determine the number of consumed licenses based on the number of tracked instances.

At circle K, the LMS 105 can cause a notifications service 135 to issue notifications to users. The content of and conditions for sending a notification may be configured by the license administrator 191 when creating the license rules configuration. Exemplary notifications include: sending a warning when existing license consumption approaches NumberOfLicenses (e.g., when an absolute or relative threshold number of consumed licenses are reached); sending an alert if a request to launch an instance is denied, the alert identifying the requested resource configuration, the license identifier that failed a compliance check, and/or an identity of the license user 192 that initiated the request; and sending an alert or warning when a license overage occurs (e.g., when UsageLimitType permits launching additional resource instances despite exceeding NumberOfLicenses).

At circle J, the LMS 105 records license usage history in a records data store 130 in some embodiments, depending for example on the value of the PreserveHistory property of the license rules configuration. When PreserveHistory is true, the LMS 105 records license usage history in the records data store 130 as specified by the PreserveHistoryLocation property. Depending on the value of the PreserveHistoryFrequency property, the history may be recorded in a change-based log that is updated each time a resource instance is launched or terminated (e.g., when PreserveHistoryFrequency is unspecified) or a snapshot-based log that includes point-in-time license usage of any existing resource instances (e.g., when PreserveHistoryFrequency is set to 2, 4, 8, etc. hour intervals).

At circle L, users can request license usage reports or pull data relating to license usage (e.g., current usage as determined by the LMS 105 or historical usage as recorded in the records data store 130). These reports or data allow customers to view license consumption in detail to identify which resources are consuming licenses, easily comply with audit requirements, or to allow license auditors 193 direct access to license usage history to avoid interrupting operations to comply with audit requests.

In some embodiments, if the properties identifying the software programs associated with a software configuration are available, adding a license identifier to a resource configuration may be omitted (i.e., circles C and D in FIG. 1). In such cases, the resource service 115 can request permission to launch an instance via a message to the LMS 105 that includes properties associated with the software configuration (without looking up or sending a license identifier at circles F and G). The LMS 105 can match the software programs associated with the resource configuration to license rules configurations within the license data store 110 as part of performing compliance checks (e.g., based on a Name property or some other property that identifies the software program).

In some embodiments, a user such as license administrator 191 can register certain resource configurations as a property within a license rules configuration. When the resource service 115 receives a request to launch a resource instance (circle E), the resource service 115 can send the identity of the resource configuration (e.g., instance type, machine image, launch template, or formation template) to the LMS 105 along with the request for permission to launch the resource instance. The LMS 105 can match the received resource configuration with resource configurations specified in properties within the license rules configuration as part of performing compliance checks.

In some embodiments, the LMS 105 may have access to the resource configurations data store 120 or a replica of the resource configurations data store 120. When the resource service 115 receives a request to launch a resource instance (circle E), the resource service 115 can send the identity of the resource configuration (e.g., instance type, machine image, launch template, or formation template) to the LMS 105 along with the request for permission to launch the resource instance. The LMS 105 can look up properties associated with the received resource configuration within the resource configurations data store 120 for use in compliance checks without receiving the properties from the resource service 115.

In some embodiments, a default set of hardware and/or software configuration properties associated with a resource configuration may not include a property that corresponds to the LicensingMetric property in the license rules configuration. In such cases, the license administrator 191 may tag the resource configuration with a key-value pair to associate a value for the LicensingMetric with the resource configuration. For example, the key may have a reserved name that, if defined, can be obtained by the LMS 105 before granting or denying permission to launch a resource instance to the resource service 115.

In some embodiments, a software vendor rather than a license administrator 191 creates a license rules configuration for a software product. In acquiring the software product, the software vendor may export the license rules configuration so the license administrator 191 can import it into the customer's license data store 110, or the software vendor may share the license rules configuration with the customer via the license data store 110.

FIG. 2 is a diagram illustrating an exemplary data structure for storing license rules configurations and tracking license usage according to some embodiments. As illustrated in FIG. 2, the exemplary data structure includes entries 290, 295, and 297. Such a data structure may be stored in the license data store 110. Like some of the license rules configuration properties described above, exemplary fields in the entries include a license identifier field 205, a license name field 210, a license description field 215, a number of licenses field 220, a licensing metric field 225, a metric to license ratio field 230, a days of affinity field 235, a limit type field 240, an allowed tenancy field 245, a preserve history field 250, and a resource identifiers or usage field 255. In this embodiment, each entry represents a license rules configuration with an exemplary set of properties. For example, entry 290 relates to Windows Server, has a limit of 200 licenses that are consumed per physical core. As another example, entry 297 relates to a video rendering library license that is limited based on a function of metrics, namely consumption is permitted for hosts with four or fewer graphics processing units (GPUs) per CPU.

In some embodiments, the LMS 105 can track license usage using an array of objects in the resource identifiers or usage field 255. The array of objects includes names that correspond to resource identifiers and values that correspond to the number of licenses consumed by the respective resource identifier, as illustrated in the resource identifiers or usage field 255 for entry 290. To determine current usage, the LMS 105 can add up the total number of consumed licenses in the array. For example, based on the listed entries, the LMS 105 can determine that 8 licenses have been consumed (i.e., 5 by the resource identified by 1-129381, 2 by the resource identified by H-199121, and 1 by the resource identified by MI-168246). In other embodiments, the LMS 105 can track license usage by keeping a count of the total number of consumed licenses, as indicated by usage field 255 for entry 295. When a license is consumed (or released) by a resource, the LMS 105 increments (or decrements) the count by the number of licenses associated with that resource.

Figure 3:
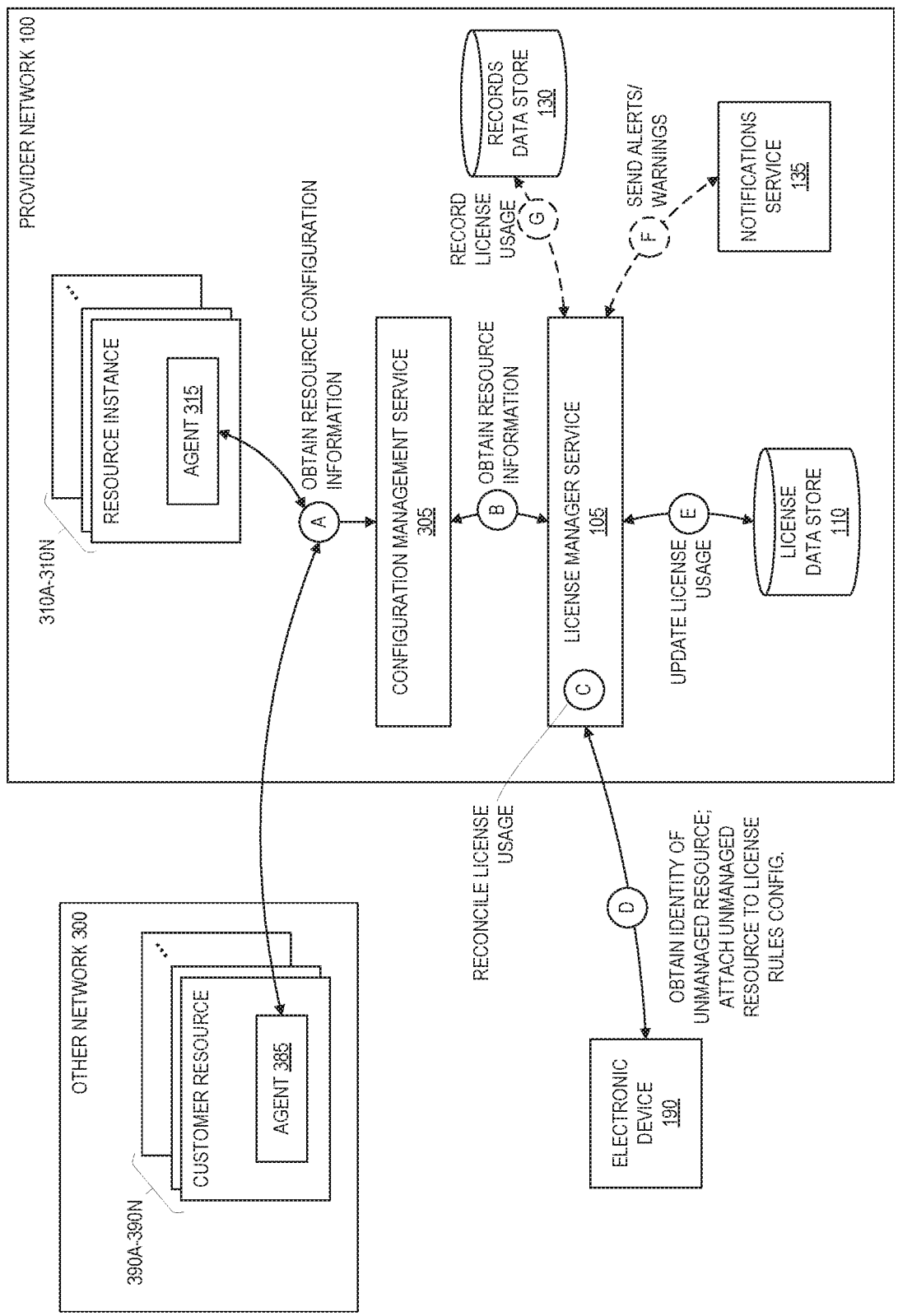
FIG. 3 is a diagram illustrating an environment for assigning and monitoring license usage associated with existing or unmanaged resources according to some embodiments.

FIG. 3 is a diagram illustrating an environment for assigning and monitoring license usage associated with existing or unmanaged resources according to some embodiments. In some situations, customers of the provider network 100 may have resource instances 310A-310N and/or customers resources 390A-390N that are in operation prior to creation of a license rules configuration or come online outside of the flow described above with reference to FIG. 1. For example, the resource instances 310-310N or customer resources 390A-390N may be part of a production environment that is hosting the customer's product offerings. As another example, some customers might not restrict license users 192 from creating resource configurations or installing additional software on resource instances 125 that have already launched. As a result, it may be impractical to terminate resource instances 310-310N or customer resources 390A-390N so that they can be restarted within the purview of the LMS 105. A configuration management service (CMS) 305 creates an inventory of resources, such as resource instances 310-310N or customer resources 390A-390N. Some of the resources in the inventory may be unmanaged from the perspective of the LMS 105. These unmanaged resources may be wholly unmanaged (e.g., by having been running prior to the creation of any applicable license rules configuration) or partly unmanaged (e.g., by having begun running a new application since the last time the CMS 305 created an inventory). Based on a comparison of the inventory to the current license usage, the customer can identify unmanaged resources and attach license rules configurations via the LMS 105, as described below with reference to circles A through E in FIG. 3.

At circle A, the CMS 305 communicates with any agents 315 associated with resource instances 310A-310N within the provider network 100. The CMS 305 also communicates with agents 385 associated with customer resources 390A-390N within one or more other networks 300 outside of the provider network 100 (e.g., networks within the customer's premises). The CMS 305 obtains information relating to each of the resources 310A-310N or 390A-390N from the respective agents 315, 385, such as the software and hardware configurations of the resources. For example, each agent 315, 385 might occasionally report information about its associated resource to the CMS 305. Other agent 315, 385 to CMS 305 communication arrangements are possible. For example, an agent might be an application associated with a hypervisor software program that indirectly monitors any virtualized machines executing within the underlying computer system. The software and hardware configuration of the resource might include properties such as those described in association with resource configurations. For example, the CMS 305 can obtain a list, including version information, of each software program executing on resources 310A-310N or 390A-390N, along with a list of properties associated with the hardware configuration of the resource such as performance properties, whether the resource is part of a shared or dedicated physical system, or whether the resource is operating using virtual or physical hardware (e.g., vCPUs versus sockets). In this manner, the CMS 305 obtains an inventory of the customer's resources 310A-310N and 390A-390N.

At circle B, the CMS 305 sends a message to the LMS 105 including the identity and configuration information for each of the resources 310A-310N or 390A-390N. The message may be sent to an API that is part of the LMS 105 and allows for backend services to interact with the LMS 105. At circle C, the LMS 105 reconciles license usage to ensure the resources identified by the CMS 305 are reflected in license usage by comparing the identified resources against current usage for license rules configurations. For example, the LMS 105 may have a record of thirteen resource identifiers consuming a number of licenses for a particular software program associated with a license rules configuration, but the CMS 305 may report the identity of fourteen resources running the software program. In this manner, the LMS 105 can discover unmanaged resources (with respect to particular license rules configurations) within the provider network 100 and/or other networks 300.

At circle D, a license administrator 191 can cause the electronic device 190 to obtain a list of unmanaged resources identified during the reconciliation process. For example, the electronic device 190 might send a filter or search term (e.g., "Windows Server") to the LMS 105 to obtain a list of any unmanaged resources that pass the filter or match the search term. Upon obtaining the identity of an unmanaged resource, the license administrator 191 can cause the electronic device 190 to send a message to the LMS 105 to attach a particular license rules configuration (e.g., via a license identifier) to the identified unmanaged resource. In response to an attachment message, the LMS 105 can perform a compliance check for the unmanaged resource against the set of rules specified by the license properties that are included in the identified license rules configuration, as described above.

At circle E, the LMS 105 may update the license data store 110 with a record of the resource identifier so that in subsequent exchanges between the CMS 305 and the LMS 105 the resource is no longer deemed unmanaged at least with respect to the attached license rules configuration. Note that in some embodiments, the LMS 105 does not evaluate the UsageLimitType property in performing the compliance check in response to an attachment request as the resource is already running Instead, if one of the rules associated with the compliance check is violated, the LMS 105 may send an alert via the notifications service 135 that indicates the compliance check was invalidated when attaching a license to an unmanaged resource, as indicated at circle F. The LMS 105 may send other alerts or warnings as described above with reference to FIG. 1. At circle G, the LMS 105 may record license usage in the records data store 130, also as described above with reference to FIG. 1.

In some embodiments, the license administrator 191 may establish a set of attachment rules with the LMS 105. The attachment rules may govern the attachment of license rules configurations to unmanaged resources identified by the CMS 305. An exemplary attachment rule includes one or more match criterion (e.g., a software program's name, version, etc.) and a license identifier (associated with the license rules configuration associated with the license agreement). Unmanaged resources that match the criterion are automatically attached to the license rules configuration associated with the license identifier by the License Manager Service 105.

Figure 4:
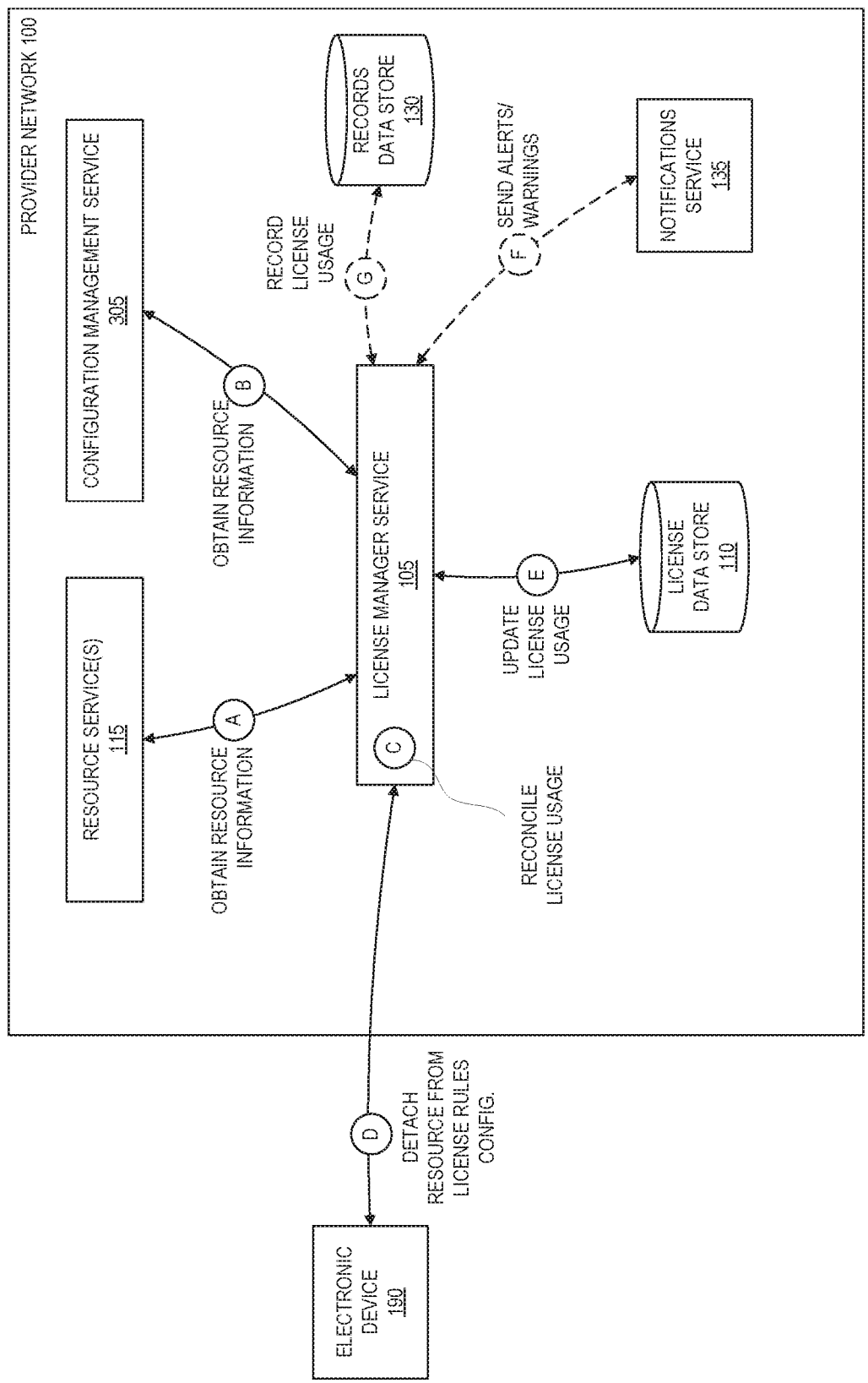
FIG. 4 is a diagram illustrating an environment for releasing licenses according to some embodiments.

FIG. 4 is a diagram illustrating an environment for releasing licenses according to some embodiments. Exemplary scenarios in which a license is released include a resource instance terminating, a particular software program executing on a resource instance being terminated, or when resource usage has to be moved from one license rules configuration to another (e.g., if a new license was negotiated).

The LMS 105 may release licenses manually (e.g., in response to a release message sent from a user's electronic device) or automatically (e.g., in response to a termination message from a resource service 115). Automatic license releases may occur as resources managed or monitored by the resource services 115 or the CMS 305 terminate or as part of a reconciliation process performed by the LMS 105. For automatic license release upon resource termination, the resource service 115 or the CMS 305 sends a message indicating a termination of a resource that has been previously identified to the LMS 105, as indicated by circles A and B. The resource may have been previously identified to the LMS 105 in a request for permission to launch a resource instance 125 as described with reference to FIG. 1, as part of identifying unmanaged resources as described with reference to FIG. 3, etc. Because license overages are not a concern during the license release process, the message from the resource service 115 or the CMS 305 may be asynchronous in that the sender need not wait for a response from the LMS 105. Release messages can be added to a queue of messages for processing by the LMS 105.

For automatic license release as part of a reconciliation process, the LMS 105 may perform a reconciliation process such as the one used to identify unmanaged resources to ensure license usage does not reflect resources that are no longer in use. The resource service(s) 115 or the CMS 305 sends a message including the identity and configuration information for each of the resources 310A-310N or 390A-390N to the LMS 105, as indicated at circles A and B. At circle C, the LMS 105 compares the received information to the license usage as determined from the license data store 110. If license usage as determined from the license data store 110 exceeds license usage based on the received information, the LMS 105 updates license usage, described below.

At circle D, customers can manually disassociate license rules configurations from resources. For example, an administrator 191 can cause an electronic device 190 to send a message to the LMS 105 to detach a resource identifier from a license rules configuration.

At circle E, the LMS 105 may update license usage in the license data store 110 regardless of whether a license was automatically or manually released. For example, the LMS 105 may remove a resource identifier associated with the resource triggering a license release stored within the license data store. As another example, the LMS 105 may decrement a number of used licenses based on one or more properties of the resource triggering the license release.

In some embodiments, the LMS 105 delays reducing license usage for a period of time after license release. In particular, the LMS 105 may delay reducing license usage for license rules configurations that include a DaysOfServerAffinity property in the license rules configurations that is non-zero (e.g., for server-bound licenses). Upon detecting a license release associated with a license rules configuration with a non-zero DaysOfServerAffinity, the LMS 105 updates the license usage (e.g., field 255) with a timestamp associated with the license release and, in some embodiments, with the number of licenses released. The LMS 105 includes a periodic process that checks for licenses that were released where the delta between the current time and license release timestamp is greater than the DaysOfServerAffinity. When the DaysOfServerAffinity property is satisfied for a given license release, the LMS 105 updates the license usage (e.g., by decrementing a total number of used licenses or by removing an entry from field 255 associated with the resource identifier that released the license).

At circle F, the LMS 105 may send alerts or warnings related to license releases via the notifications service 135 as described above with reference to FIGS. 1 and 3. At circle G, the LMS 105 may record license usage in the records data store 130, also as described above with reference to FIGS. 1 and 3.

Figure 5:
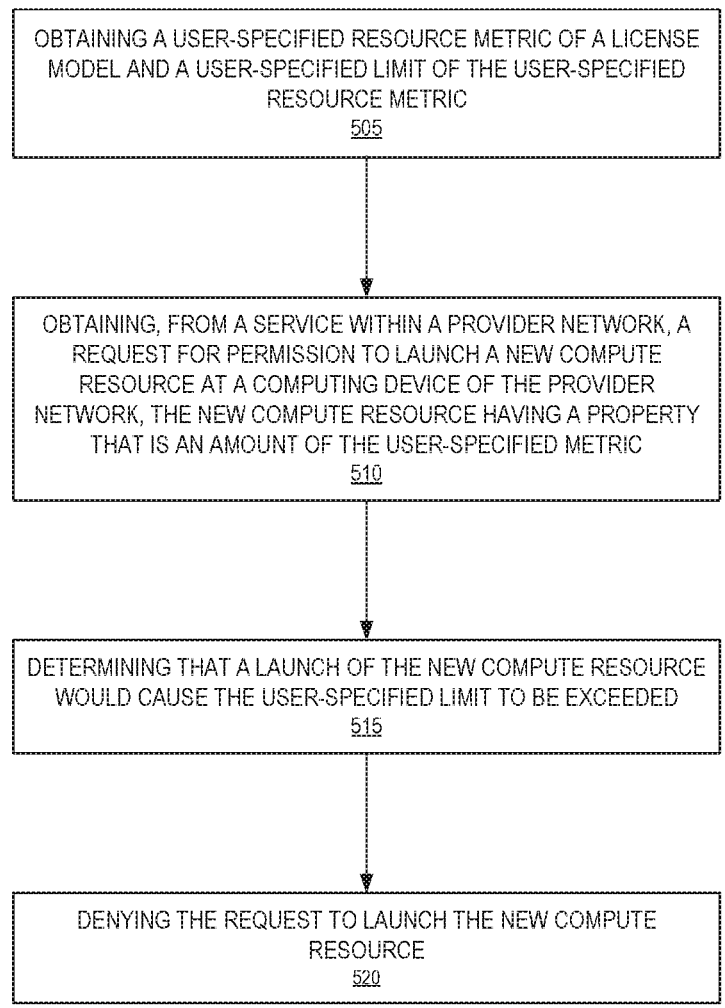
FIG. 5 is a flow diagram illustrating operations of a method for tracking license usage according to some embodiments.

FIG. 5 is a flow diagram illustrating operations of a method for tracking license usage according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the LMS 105 of the other figures.

The operations include, at block 505, obtaining a user-specified resource metric of a license model and a user-specified limit of the user-specified resource metric. For example, the LMS 105 could obtain the user-specified resource metric of a license model and/or the user-specified limit of the user-specified resource metric from an electronic device 190 or from the license data store 110 (e.g., as part of a license model or definition). In some embodiments, the user-specified resource metric corresponds to a property of a license rules configuration such as the LicensingMetric property described above. Likewise, the user-specified limit may correspond to a property of a license rules configuration such as the NumberOfLicenses property described above.

The operations include, at block 510, obtaining, from a service within a provider network, a request for permission to launch a new compute resource at a computing device of the provider network, the new compute resource having a property that is an amount of the user-specified metric. For example, the request might be for a particular resource configuration (e.g., an instance type, machine image, launch template, or formation template) and originate from a resource service 115, such as a resource service 115 that provides compute or database instances. The property that is an amount of the user-specified metric may be a resource configuration property received with the launch request or looked up based on information contained in the launch request, or a user-defined property that is associated with the resource configuration. Exemplary properties include vCPUs (if the user-specified metric identifies vCPUs), memory throughput (if the user-specified metric identifies memory throughput), cores (if the user-specified metric identifies cores), etc.

The operations include, at block 515, determining that a launch of the new compute resource would cause the user-specified limit to be exceeded. The LMS 105 may make such a determination in a variety of ways, including those described above. For example, the LMS 105 may maintain a current license usage count and the different difference between the current count and the number of available licenses is used in a comparison of the property of the "new" (identified in the launch request, but before instantiation) compute resource. As another example, the LMS 105 may maintain a number of available licenses to compare to the property in making the determination.

The operations include, at block 520, denying the request to launch the new compute resource. For example, the LMS 105 may send a message to the resource service 115 that originated the request that causes the resource service 115 to terminate the launch process. The message may further have content destined for the initiator of the request (e.g., a license user 192) that can be relayed to the initiator, e.g., via the resource service 115 and an electronic device 190.

Figure 6:
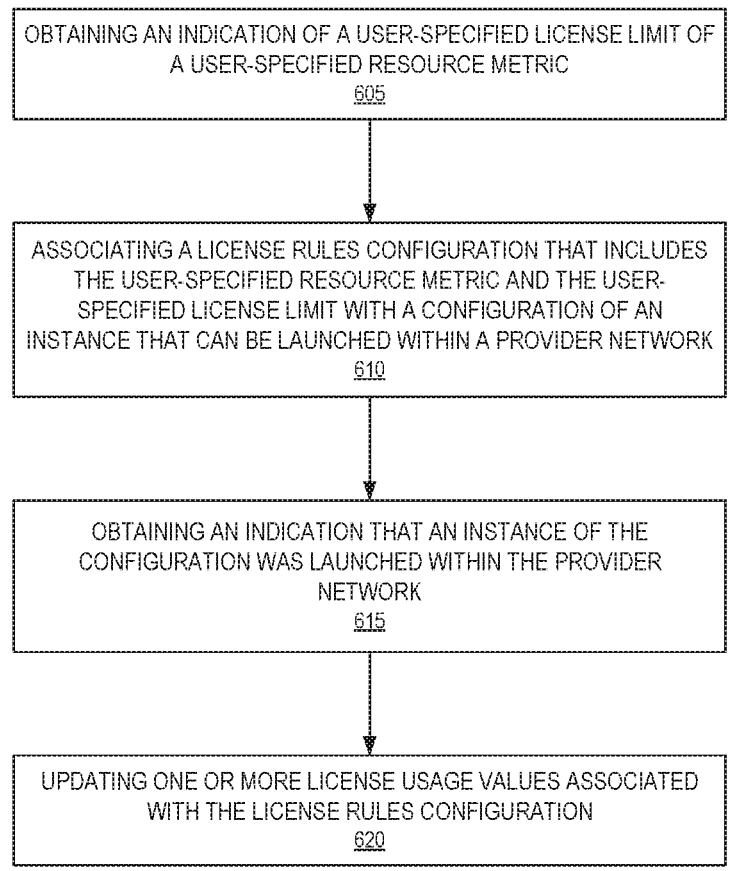
FIG. 6 is another flow diagram illustrating operations of a method for tracking license usage according to some embodiments.

FIG. 6 is another flow diagram illustrating operations of a method for tracking license usage according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the LMS 105 of the other figures.

The operations include, at block 605, obtaining an indication of a user-specified license limit of a user-specified resource metric. For example, the LMS 105 could obtain the user-specified resource metric of a user-specified resource metric from an API call made by the electronic device 190 or from the license data store 110 as part of an existing license rule configuration. In some embodiments, the user-specified resource metric corresponds to a property of a license rules configuration such as the LicensingMetric property described above. Likewise, the user-specified limit may correspond to a property of a license rules configuration such as the NumberOfLicenses property described above.

The operations include, at block 610, associating a license rules configuration that includes the user-specified resource metric and the user-specified license limit with a configuration of an instance that can be launched within a provider network. For example, the resource service 115 obtains an identity of a license rules configuration (e.g., from an API call made by the electronic device 190, from the LMS 105) and creates an association between the identified license rules configuration and a resource configuration in the resource configurations data store 120. As another example, the LMS 105 obtains an identification of the resource configuration and creates an association between the identified resource configuration and a license rules configuration in the license data store 110.

The operations include, at block 615, obtaining an indication that an instance of the configuration was launched within the provider network. For example, the LMS 105 obtains an indication of a launch of an instance of a particular resource configuration from the resource service 115 that launches such instances, as described above with reference to FIG. 1. As another example, the LMS 105 obtains an indication of an instance of a particular resource configuration from the CMS 305 as part of a license reconciliation process, as described above with reference to FIG. 3.

The operations include, at block 620, updating one or more license usage values associated with the license rules configuration. For example, the resource identifiers or usage field 255 maintained in the license data store 110 allows the LMS 105 to track license usage. After receiving an indication of the resource configuration at block 615, the LMS 105 updates a license usage value to indicate that number of available licenses has decreased or the number of consumed licenses has increased, or to update a list of resource identifiers that identify the specific instances that are consuming available licenses associated with the license rules configuration.

At least some of the operations illustrated in FIG. 6 may be performed in conjunction with or in addition to operations illustrated in FIG. 5. As an example, some embodiments may perform operations 510-520, which generally relate to denying the launch of a resource or instance, in addition to operations 610-620, which generally relate to tracking license usage.

Figure 7:
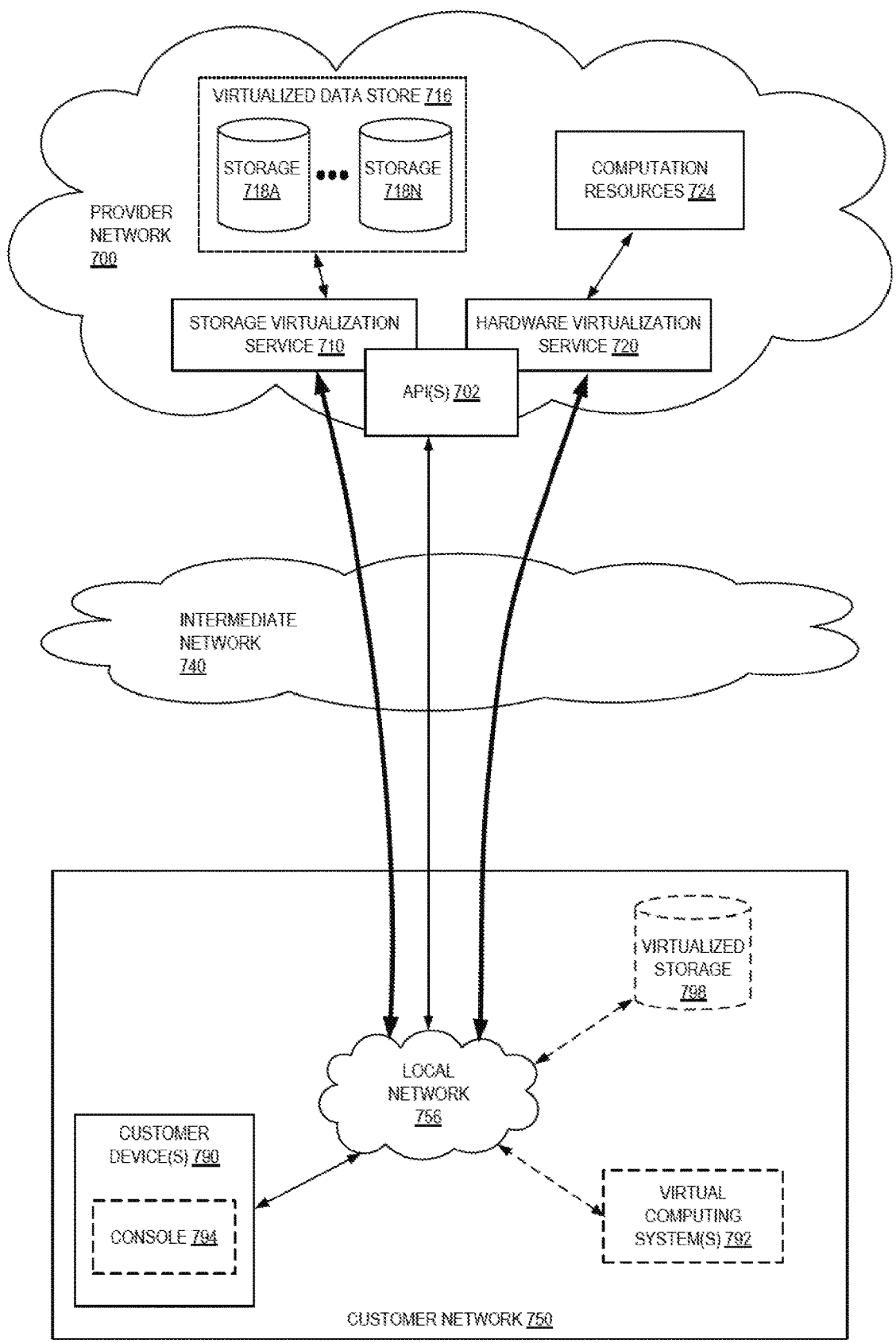
FIG. 7 is a block diagram of an example provider network that provides a storage virtualization service and a hardware virtualization service to customers according to some embodiments.

FIG. 7 is a block diagram of an example provider network that provides a storage virtualization service and a hardware virtualization service to customers, according to some embodiments. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage virtualization service 710, for example via one or more APIs 702, to access data from and store data to storage resources 718A-718N of a virtual data store 716 provided by the provider network 700. In some embodiments, a virtualized data store gateway (not shown) may be provided at the customer network 750 that may locally cache at least some data, for example frequently accessed or critical data, and that may communicate with virtualized data store service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes, which appear to the user as local virtualized storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Figure 8:
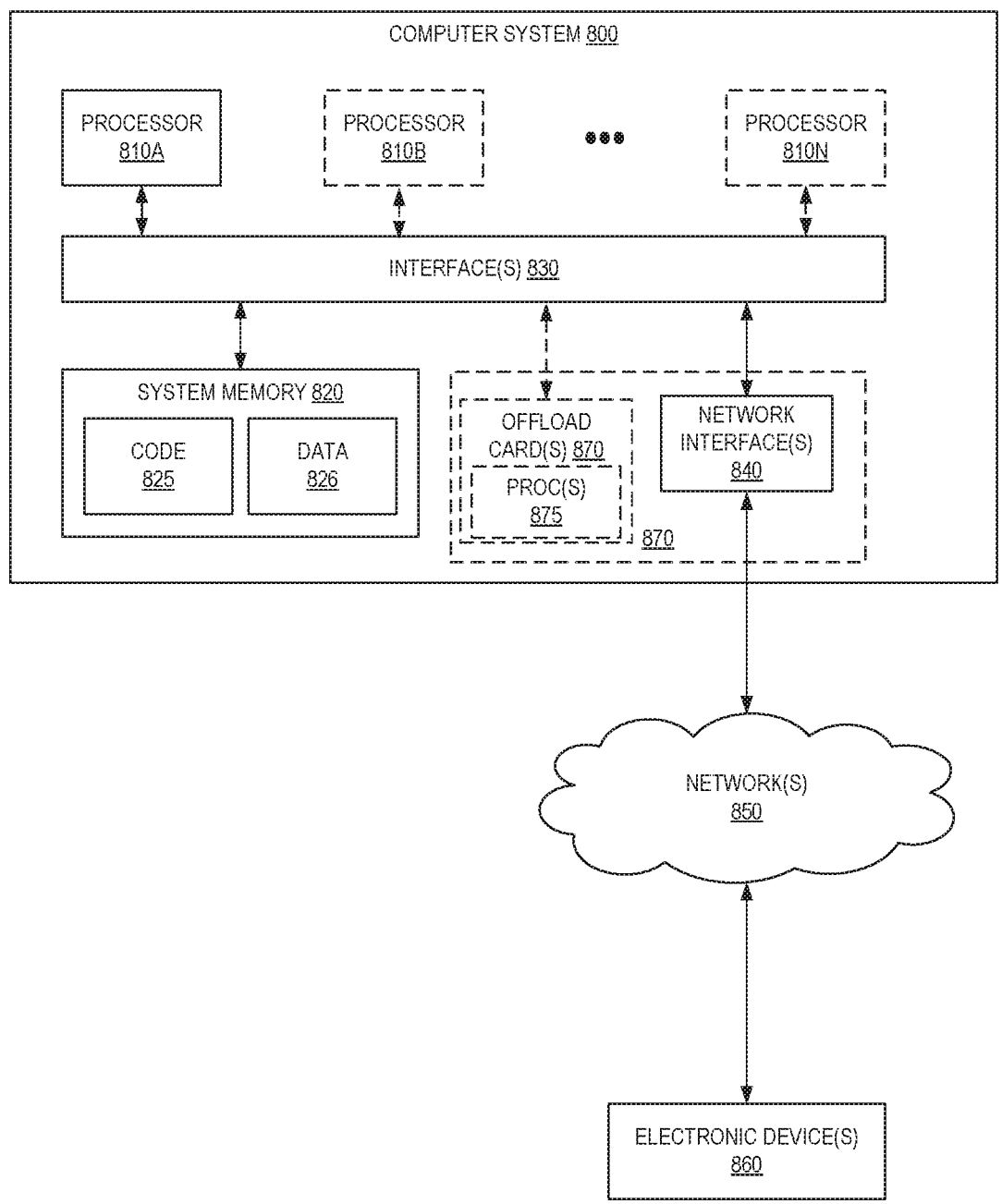
FIG. 8 is a block diagram illustrating an example computer system that may be used in some embodiments.

In some embodiments, a system that implements a portion or all of the techniques for managing licensed resources as described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for managing licensed resources, are shown stored within system memory 820 as code 825 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 310A-310N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic.

Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    obtaining, from a service within a provider network, a first request, based on a user-initiated request received from outside the provider network, for permission to launch a first new compute resource of a plurality of compute resources that can be launched within the provider network, wherein, for the first new compute resource, an associated resource configuration stored in a first data store of the provider network is further associated with a user-specified license rule configuration stored in a second data store of the provider network, wherein the user-specified license rule configuration is associated with a license required for the first new compute resource to operate within the provider network, and wherein the associated resource configuration specifies hardware and/or software associated with an instance of the new compute resource;
    obtaining, from the user-specified license rule configuration associated with the first new compute resource, an indication of a user-specified limit of a user-specified resource metric, the user-specified resource metric to identify a license consumption measure, wherein the user-specified license rule configuration is specified via an application programming interface of the provider network;
    determining that a launch of the first new compute resource would cause the user-specified limit to be exceeded;
    denying the request to launch the first new compute resource;
    obtaining, from the service within the provider network, a second request for permission to launch a second new resource within the provider network, the second new resource having a property that is an amount of the user-specified resource metric;
    determining that a launch of the second new resource would not cause the user-specified license limit to be exceeded;
    granting the second request to launch the second new resource;
    updating one or more license usage values associated with the user-specified license rule configuration that includes the user-specified resource metric and the user-specified license limit;
    obtaining an indication that the second new resource terminated, the second new resource associated with a number of licenses; and
    updating the one or more of the license usage values by the number of licenses, wherein a time between obtaining the indication that the second new resource terminated and updating the one or more license usage values is delayed by a user-specified delay.

2. The computer-implemented method of claim 1, wherein the user-specified license rule configuration relates to a software program licensed under a license agreement.

3. The computer-implemented method of claim 1, wherein the request for permission to launch the new compute resource is a request for permission to launch a compute instance or a database instance within the provider network.

4. A computer-implemented method comprising:
    obtaining, from a service within a provider network, a first request, based on a user-initiated request received from outside the provider network, for permission to launch a first new resource of a plurality of resources that can be launched within the provider network, wherein the first new resource has an associated resource configuration that is further associated with a user-specified license rule configuration, wherein the user-specified license rule configuration is associated with a license required for the first new resource to operate within the provider network, and wherein the resource configuration specifies hardware and/or software associated with an instance of the first new resource;
    obtaining, from the user-specified license rule configuration, an indication of a user-specified license limit of a user-specified resource metric, the user-specified resource metric to identify a license consumption measure, wherein the user-specified license rule configuration is specified via an application programming interface of the provider network;
    determining that a launch of the first new resource would cause the user-specified license limit to be exceeded based at least in part on a property indicated by the associated resource configuration that is an amount of the user-specified resource metric;
    denying the first request to launch the first new resource;
    obtaining, from the service within the provider network, a second request for permission to launch a second new resource within the provider network, the second new resource having a property that is an amount of the user-specified resource metric;
    determining that a launch of the second new resource would not cause the user-specified license limit to be exceeded;
    granting the second request to launch the second new resource;
    updating one or more license usage values associated with the user-specified license rule configuration that includes the user-specified resource metric and the user-specified license limit;
    obtaining an indication that the second new resource terminated, the second new resource associated with a number of licenses; and
    updating the one or more of the license usage values by the number of licenses, wherein a time between obtaining the indication that the second new resource terminated and updating the one or more license usage values is delayed by a user-specified delay.

5. The computer-implemented method of claim 4, further comprising:
obtaining, from the service within the provider network, a second request for permission to launch a second new resource within the provider network, the second new resource not having a property that is an amount of the user-specified resource metric; and
denying the second request to launch the second new resource.

6. The computer-implemented method of claim 5, further comprising:
obtaining an indication that the second new resource terminated; and
updating the one or more license usage values by removing an association between the user-specified license rule configuration and an identifier of the second new resource.

7. The computer-implemented method of claim 4, further comprising adjusting the amount by a ratio relating the user-specified resource metric to the user-specified license limit.

8. The computer-implemented method of claim 4, wherein the first request for permission includes a license identifier that identifies the license rule configuration that includes the user-specified resource metric and the user-specified license limit.

9. The computer-implemented method of claim 4, wherein the user-specified resource metric and the user-specified license limit relate to a license agreement for a software program.

10. The computer-implemented method of claim 4, wherein the first request for permission to launch the new compute resource is a request for permission to launch a compute instance or a database instance within a provider network.

11. A computer-implemented method comprising:
obtaining an indication of a user-specified license limit of a user-specified resource metric via an application programming interface of a provider network from an electronic device that is outside the provider network, the user-specified resource metric to identify a license consumption measure;
associating a user-specified license rule configuration that includes the user-specified resource metric and the user-specified license limit with a resource configuration associated with an instance that can be launched within the provider network, wherein the resource configuration specifies hardware and/or software associated with the instance, wherein the user-specified license rule configuration is associated with a license required for the instance to operate within the provider network, and wherein the user-specified license rule configuration is specified via the application programming interface of the provider network;
obtaining an indication that the instance associated with the resource configuration was launched within the provider network based at least in part on a first request from outside the provider network;
updating one or more license usage values associated with the user-specified license rule configuration;
obtaining an indication that the instance terminated, the instance associated with a number of licenses; and
updating the one or more of the license usage values by the number of licenses, wherein a time between obtaining the indication that the instance terminated and updating the one or more license usage values is delayed by a user-specified delay.

12. The computer-implemented method of claim 11, further comprising:
obtaining an indication that the instance terminated; and
updating the one or more license usage values by removing an association between the user-specified license rule configuration and an identifier of the instance.

13. The computer-implemented method of claim 11, further comprising:
determining that a launch of another instance associated with the resource configuration would cause the user-specified license limit to be exceeded;
obtaining a second request for permission to launch a new instance, the new instance being associated with the resource configuration; and
denying the request to launch the new instance.

14. The computer-implemented method of claim 13, wherein the request for permission to launch the new instance is obtained from a service within the provider network.

* * * * *